United States Patent [19]

Garrison, Jr.

[11] 4,121,016

[45] Oct. 17, 1978

[54] COMPOSITION OF VINYL CHLORIDE POLYMER AND TWO ACRYLIC POLYMERS WHICH CAN BE REINFORCED WITH POLYESTER

[75] Inventor: William Emmett Garrison, Jr., Wilmington, Del.

[73] Assignee: E. I. Du Pont de Nemours and Company, Wilmington, Del.

[21] Appl. No.: 758,491

[22] Filed: Jan. 11, 1977

Related U.S. Application Data

[62] Division of Ser. No. 667,660, Mar. 17, 1976, abandoned.

[51] Int. Cl.² .................. B32B 27/30; C08L 27/06; C08L 33/12
[52] U.S. Cl. .......................... 428/483; 260/5; 260/23.7 H; 260/876 R; 260/880 R; 260/897 C; 260/899; 428/518; 428/520; 428/522
[58] Field of Search .............. 428/483, 518, 520, 522, 428/395; 260/23.7 H, 5, 876 R, 880 R, 897 C, 899

[56] References Cited

U.S. PATENT DOCUMENTS

| | | | |
|---|---|---|---|
| 2,829,069 | 4/1958 | Michl | 428/483 |
| 2,907,882 | 10/1959 | Patten | 428/483 X |
| 3,312,756 | 4/1967 | Baer et al. | 260/876 R |
| 3,316,192 | 4/1967 | Seibel | 260/897 C |
| 3,808,293 | 4/1974 | Garrison | 260/23.7 H |
| 3,821,329 | 6/1974 | Gallagher | 260/876 R |
| 3,928,710 | 12/1975 | Arnold | 428/483 |
| 3,988,392 | 10/1976 | Kameda et al. | 260/876 R |
| 4,002,802 | 1/1977 | Bayless et al. | 428/483 |
| 4,010,305 | 3/1977 | Wang | 428/518 |
| 4,014,842 | 3/1977 | Kosugi et al. | 260/876 R |
| 4,022,849 | 5/1977 | Jin et al. | 260/876 R |
| 4,035,443 | 7/1977 | Ide et al. | 260/876 R |

*Primary Examiner*—Harold Ansher

[57] ABSTRACT

A composition contains (A) 60 to 80 parts by weight of vinyl chloride polymer (B) 11 to 23 parts by weight of an acrylic elastomeric polymer formed from butyl acrylate and methyl methacrylate and (C) 15 to 30 parts by weight of a second acrylic polymer formed from methyl methacrylate.

The composition is useful for moldings and extrusions particularly where good weatherability and/or reduced smoke generation are required and can be directly bonded to and reinforced with polyester.

10 Claims, No Drawings

COMPOSITION OF VINYL CHLORIDE POLYMER AND TWO ACRYLIC POLYMERS WHICH CAN BE REINFORCED WITH POLYESTER

This is a division of application Ser. No. 667,660, filed Mar. 17, 1976, now abandoned.

BACKGROUND OF THE INVENTION

The present invention relates to a composition containing vinyl chloride polymer and two different types of acrylic polymers and also relates to such composition reinforced with polyester.

Blends of polyvinyl chloride are known in the prior art, e.g. blends of U.S. Pat. Nos. 3,312,756; 3,316,192 and 3,808,293. 3,312,756 discloses a two-component blend of polyvinyl chloride and acrylonitrile/butadiene/styrene copolymer. U.S. Pat. No. 3,316,192 discloses a blend of polyvinyl chloride, acrylic polymer and chlorinated polyethylene. U.S. Pat. No. 3,808,293 teaches a blend of polyvinyl chloride, an acrylonitrile/butadiene/styrene copolymer and an acrylic polymer.

SUMMARY OF THE INVENTION

The present invention is directed to an improved composition consisting essentially of (A) 60 to 80 parts by weight of vinyl chloride polymer containing at least about 85% by weight vinyl chloride polymerized units;

(B) 11 to 23 parts by weight of acrylic elastomeric polymer containing about 30 to about 95% by weight butyl acrylate polymerized units and about 70 to about 5% by weight methyl methacrylate polymerized units; and (C) 15 to 30 parts by weight acrylic polymer containing about 75 to 100% by weight methyl methacrylate polymerized units and about 25 to 0% by weight-lower alkyl acrylate polymerized units.

The composition is particularly useful when bonded directly to a polyester reinforcing material.

DETAILED DESCRIPTION OF THE INVENTION

The three-component composition of the present invention which can be either reinforced or unreinforced consists essentially of:

(A) a vinyl chloride polymer;

(B) an acrylic elastomeric polymer containing butyl acrylate polymerized units and methyl methacrylate polymerized units and (C) an acrylic polymer containing methyl methacrylate polymerized units and optionally lower alkyl acrylate polymerized units.

The composition of the present invention is an improvement over the composition disclosed in my U.S. Pat. No. 3,808,293. The present improved composition has mechanical properties similar to U.S. Pat. No. 3,808,293 but in addition has improved weatherability characteristics, lower smoke generation and most importantly can be bonded directly to a polyester without need for a primer to obtain adhesion.

The vinyl chloride component is contained in the three-component composition in an amount of 60 to 80 parts by weight and preferably 61 to 70 parts by weight. The vinyl chloride polymer can be either a homopolymer or a copolymer and contains at least about 85% by weight polymerized units of vinyl chloride. Conventional comonomers in the art used in forming a copolymer of polyvinyl chloride can be employed; particularly preferred are lower α-olefins of two to four carbon atoms.

The vinyl chloride polymer generally has an inherent viscosity from about 0.5 to about 1.2 and preferably about 0.65 to about 1.0 as measured in accordance with ASTM D-1243-66.

A second constituent of the three-component blend is an acrylic elastomeric polymer in an amount of 11 to 23 parts by weight and preferably 13 to 20 parts by weight. This acrylic polymer contains about 30 to about 95% by weight butyl acrylate polymerized units and about 70 to about 5% by weight methyl methacrylate polymerized units. A preferred acrylic polymer composition contains about 40 to 90% by weight butyl acrylate polymerized units and about 60 to about 10% by weight methyl methacrylate polymerized units and more preferably about 60 to about 85% by weight butyl acrylate polymerized units and about 40% to about 15% by weight methyl methacrylate polymerized units.

The acrylic elastomeric polymer can be prepared in accordance with well known techniques. For example, a monomer mixture of methyl methacrylate and butyl acrylate can be polymerized with a latex of an elastomer containing at least about 70% by weight, preferably at least about 90% by weight, of polymerized units of butyl acrylate and the remainder polymerized units of methyl methacrylate. As discussed, the acrylic elastomer has polymerized units within the stated ranges. It is understood that in preparing the latex a crosslinking agent is normally employed, e.g. an olefinic diester such as ethylene glycol dimethacrylate. The residue of such crosslinking agent is measurable in the polymer but is usually present in low amounts (well under 1% by weight).

A third constituent of the three-component blend is another acrylic polymer present in an amount of 15 to 30 parts by weight and preferably 18 to 27 parts by weight. The acrylic polymer contains at least about 75% by weight methyl methacrylate polymerized units (including 100%). If additional polymerized units of another monomer are present, they are formed from a lower alkyl acrylate wherein alkyl contains 1 to 4 carbon atoms. Ethyl is most preferred for the alkyl. A preferred composition contains at least about 95% by weight methyl methacrylate polymerized units and lower alkyl acrylate in an amount up to about 5% by weight.

As disclosed in U.S. Pat. No. 3,808,293, this acrylic polymer normally has an inherent viscosity of from 0.3 to 0.6 (measured in a Cannon-Fenske Number 50 viscometer on a solution of 0.50 g of polymer per 100 ml. of solution in chloroform and a temperature of 20° C.)

A suitable use for the three-component composition is in conjunction with a reinforcing material. The three-component composition of this invention can be directly bonded to a polyester, hence use of polyester as a reinforcing material is preferred. Generally polyvinyl chloride polymer compositions, e.g., those in U.S. Pat. No. 3,808,293, do not adhere to a polyester without the use of a primer. Such primer is obviated in the present case.

Polyester as employed herein is limited to a thermoset (i.e., crosslinked) resin mixture and excludes a thermoplastic polymer, e.g., see Modern Plastics Encyclopedia, Vol. 52, No. 10A, October, 1975, pages 58, 61 and 62. A thermosetting precursor to such polyester is an ethylenically-unsaturated polymerization product (via esterification) of a glycol or polyol with a dibasic acid or acid anhydride where one of the components used produces points of ethylenic unsaturation. Such precursor is dissolved in a vinyl monomer prior to crosslinking to form the thermoset resin mixture. Suitable glycols or polyols include ethylene glycol, butylene glycol, bisphenol, and glycerol. Suitable acids can be aromatic in nature such as phthalic acid or ethylenically unsaturated such as maleic acid. Suitable vinyl monomers include styrene, vinyl toluene, diallyl phthalate and divinyl benzene.

Conventionally in use of a polyester as a reinforcing material, the mixture of the thermosetting precursor and the vinyl monomer contact the three-component composition of the present invention prior to crosslinking. As previously discussed, the polyester can directly bond to the three-component composition without use of a primer.

Reinforcing additives are conventionally employed within a matrix of the polyester and include fibers such as made from glass, metal, graphite and fillers such as clay, silica, calcium sulphate and metal particles.

As previously mentioned, the composition of the present invention has similar (although not identical) mechanical properties as disclosed in U.S. Pat. No. 3,808,293. The compositions differ primarily in the elastomeric component. In the present invention an acrylic polymer containing butyl acrylate polymerized units and methyl methacrylate polymerized units is employed while in U.S. Pat. No. 3,808,293 an acrylonitrile/butadiene/styrene polymer is used.

In comparison to the composition disclosed in my U.S. Pat. No. 3,808,293, the composition of the present invention (at an equal or similar concentration of vinyl chloride polymer and acrylic polymer containing predominantly methyl methacrylate polymerized units) has improved weatherability characteristics, lower smoke generation and can be directly bonded to polyester without use of a primer. The weatherability characteristics which include retention of elongation, impact resistance and/or color are important in outdoor application of the composition, e.g., in outdoor signs, housings, building products, etc. The property of low smoke generation, particularly when coupled with a low smoke generating polyester reinforcing material, is important in indoor application, e.g., in bathroom fixtures such as tubs and showers. A test for smoke generation can be in accordance with National Fire Protection Association method NFPA 258T.

Although as an unreinforced material, the composition of the present invention has been disclosed as a three-component system, it is understood that additives can be employed such as inhibitors, stabilizers, lubricants, pigments, fillers, etc.

These additives are well known in the prior art, e.g., disclosed in U.S. Pat. No. 3,808,293. For purposes of illustration, a composition containing vinyl chloride polymer conventionally includes an inhibitor to prevent dehydrochlorination of this polymer; stabilizers are frequently used with an acrylic polymer composition.

The composition is an intimate blend of the components recited above and is prepared by conventional methods which include blending the components and melt compounding them on an extruder, hot roll mill, etc. The composition can be molded or extruded into various objects. Sheets extruded from the composition of this invention are easily thermoformed into articles such as housings, furniture, bins, etc.

To illustrate the present invention, the following examples are provided. All parts and percentages are by weight unless otherwise specified. Test methods include the following: specific gravity— ASTM D 792; tensile strength and elongation — ASTM D 638; flexural modulus and strength — ASTM D 790; Rockwell Hardness ASTM D 785-65 and notched Izod — ASTM D 256.

EXAMPLE 1

A composition was made by blending, in a ribbon blender, 64 parts polyvinyl chloride homopolymer (inherent viscosity 0.87), 20 parts of a copolymer of 87% by weight methyl methacrylate polymerized units and 13% by weight ethyl acrylate polymerized units (inherent viscosity 0.45), 2.02 parts Ferro 839 organotin maleate stabilizer, 0.23 parts Ferro 886 organotin mercaptide stabilizer, 1.75 parts Hoechst XL-223 oxidized polyethylene wax lubricant, 12 parts "Ti-Pure R-960" titanium dioxide and 16 parts Acryloid KM 323B, which is an acrylic elastomeric polymer containing butyl acrylate polymerized units (within a range of about 30 to about 75% by weight) and methyl methacrylate polymerized units (within a range of about 25 to about 70% by weight).

This blend was melt compounded and pelletized on a Schloemann - Fellows BT-80 80 mm. twin screw extruder. Stock temperature exit the head of the extruder was approximately 200° C. The pellets were molded into test bars on a 3 oz. Van Dorn reciprocating screw injection molding machine equipped with a vinyl screw. The temperature of the melt was approximately 210° C.

Properties of the composition are listed in Tables I and II.

CONTROL FOR EXAMPLE 1

A similar procedure was followed as in Example 1 except the following composition was employed: 64 parts by weight of polyvinyl chloride homopolymer (inherent viscosity 0.87), 20 parts of a copolymer of 87% by weight methyl methacrylate polymerized units and 13% by weight ethyl acrylate polymerized units, (inherent viscosity of 0.45), 1.75 parts Ferro 886 organotin mercaptide stabilizer, 1.75 parts Hoechst XL-223 oxidized polyethylene wax lubricant, 2.75 parts "Ti-Pure R-960" titanium dioxide, and 16 parts of Blendex 311 which is an acrylonitrile/butadiene/styrene resin. Properties of the composition are listed in Tables I and II.

Table I

| Physical Properties ⅛″ injection molded Bars | Example 1 | Control for Example 1 |
|---|---|---|
| Specific Gravity | 1.38 | 1.28 |
| Tensile Strength, psi[1] | 6040 | 6620 |
| Elongation, % | 99 | 88 |
| Flexural Modulus, psi | 342 | 370 |
| Flexural Strength, psi | 9800 | 10,600 |
| Notched Izod ft-lb/in. | | |
| 73° F | 14 | 14 |
| 0° F | 1.1 | 1.9 |
| −40° F | 0.6 | 0.9 |
| Hardness, Rockwell R | 106 | 109 |
| Heat Deflection Temp ° C. at 264 psi[2] | 75 | 75 |
| Flammability, UL Bulletin 94 | V-0 | V-0 |

[1] Pulled at 0.2″/minute
[2] Annealed 2 hours at 65° C.

Table II

Weathering Properties
⅛" injection molded bars

| | Hours Weather-Ometer | | |
|---|---|---|---|
| | 0 | 1000 | 2000 |
| Tensile Strength, psi | | | |
| Example 1 | 6040 | 6860 | 6960 |
| Control for Example 1 | 6620 | 7620 | 7680 |
| Tensile Elongation, % | | | |
| Example 1 | 99 | 74 | 108 |
| Control for Example 1 | 88 | 10 | 10 |
| Notched Izod, ft-lb/inch | | | |
| Example 1 | 14.0 | 9.0 | 6.8 |
| Control for Example 1 | 14.0 | 2.4 | 2.2 |
| Yellowness Index | | | |
| Example 1 | −0.1 | 0.3 | 1.6 |
| Control for Example 1 | 1.0 | 42.0 | 42.4 | pulled at 0.2"/minute

Table I shows that the composition of claim 1 and the Control for Example 1 have similar mechanical properties. Table II shows that the composition of Example 1 has superior retention of elongation, impact resistance and color on exposure to accelerated weathering.

EXAMPLE 2

A composition was blended and melt compounded in the manner of Example 1. This composition consisted of 64 parts polyvinyl chloride homopolymer (inherent viscosity 0.77), 20 parts of a copolymer of 99.75% by weight methyl methacrylate polymerized units and 0.25% ethyl acrylate polymerized units, 1.8 parts Ferro 839 organotin maleate stabilizer, 0.2 part Ferro 886 organotin mercaptide stabilizer, 0.65 part Hoechst XL223 oxidized polyethylene wax lubricant, 4 parts of a pigment system consisting primarily of titanium dioxide, 0.5 part Tinuvin P which is a benzotriazole ultraviolet screening agent and 16 parts of Acryloid KM 323 B (acrylic elastomeric polymer identified in Example 1).

The physical properties of injection molded bars were measured and were similar to those of Example 1.

The composition was extruded into 0.040 inch thick sheet on a commercial 24:1 4½ sheet line and the sheet was press laminated to ⅛ thick. The smoke generation of this material was measured and the data is found in Table III.

An 8 inch square piece of this press laminated sheet was wiped with acetone to remove traces of surface contaminants and was fitted with a 7 inch × 7 inch (inside dimensions) × 3/16 inch deep steel chase. Approximately 20 g. Stypol 40-2183 polyester resin catalyzed with 1% of Pennwalt Lupersol DDM (a 60% solution of methyl ethyl ketone peroxide in dimethyl phthalate) was spread on the prepared laminated sheet surface within the chase and allowed to gel for approximately 20 minutes. Then threee 6 inch × 6 inch pieces of Owens-Corning OCF M700 1½ oz. job strand glass mat were individually added and saturated and rolled with additional catalyzed polyester. The chase was filled with the catalyzed polyester and the laminate allowed to cure a minimum of 16 hours at room temperature. The cured laminate was cut into 1 inch wide strips and the edge strips were discarded.

Lap shear adhesion was determined on the remaining strips according to ASTM D-1002 (modified by slotting opposite laminate layers to centerline to provide an effective lap area of ½ inch²). The value for this laminate was 1020 psi. This adhesion was reduced to 911 psi by exposure to temperature/humidity cycling according to MIL-STD-810B, Method 507, Procedure I. This accelerated environmental test is designed to determine the resistance of materials to the effects of exposure to a warm, highly humid atmosphere such as encountered in tropical areas. The relatively small loss in adhesion indicates that the adhesive bond would be expected to be durable under such conditions.

CONTROL FOR EXAMPLE 2

A composition was blended and melt compounded in the manner of Example 1. This composition consisted of 64 parts polyvinyl chloride homopolymer (inherent viscosity of 0.75), 20 parts of a copolymer of 99.75% by weight methyl methacrylate polymerized units and 0.25% ethyl acrylate polymerized units, 2 parts of Ferro 886 organotin mercaptide stabilizer, 0.65 part of Hoechst XL223 oxidized polyethylene wax, 5 parts of a white pigment system, substantially titanium dioxide and 16 parts of Blendex 311 which is an acrylonitrile/butadiene/stryrene resin.

Physical properties of injection molded bars were measured and were similar to those of Example 1.

The composition was extruded into a sheet and tested for adhesion to fibrous glass reinforced polyester in the manner described under Example 2. The lap shear adhesion was 200 psi.

Smoke generation of this composition was measured and the data is included in Table III.

EXAMPLE 3

The composition of Example 2 was reinforced in a manner similar to that Example except the liquid polyester (Owens-Corning OCF E 451-1) was mixed with an equal weight of Solem SB 336-SP alumina trihydrate and catalyzed with 1% Lupersol DDM (based on the weight of OCF E 451-1).

A laminate was formed in accordance with the procedure of Example 2. Lap shear adhesion of the resulting laminate was measured and was 925 psi; this value was increased to 1054 psi after exposure to temperature/humidity cycling according to MIL STD-810B, Method 507, procedure I. The thicknesses of the composition of Example 2 and of the fibrous glass reinforced polyester layer were varied as shown in Table III.

Table III shows that reinforcement with the appropriate polyester can substantially further reduce smoke generation.

Smoke formation for Table III was determined in an NBS Smoke Chamber according to NFPA 258T (National Fire Protection Association) in the flaming mode. When composite laminates were tested, they were mounted with the layer of the blend (Example 2) facing the heat source.

Table III

| | Thickness, inches | | | |
|---|---|---|---|---|
| Example | Blend Layer | Polyester Layer | 4-minute ds | d max. (corrected) |
| 2 | .125 | 0 | 395 | 545 |
| 2 | .060 | 0 | 445 | 472 |
| Control for 2 | .125 | 0 | 525 | 740 |
| 3 | .120 | .130 | 234 | 527 |
| 3 | .060 | .140 | 206 | 292 |
| 3 | .040 | .140 | 164 | 246 | ds is specific optical density at 4 minutes burning time
dm (corrected) is corrected maximum specific optical density over duration of test Table III shows that Example 2 has less smoke formation than the Control for Example 2.

What is claimed is:

1. A reinforced composition consisting essentially of a polyester directly bonded to a composition consisting essentially of
- (A) 60 to 80 parts by weight of vinyl chloride polymer comtaining at least about 85% by weight vinyl chloride polymerized units, in which any copolymer units are polymerized units of a lower α-olefin of 2 to 4 carbon atoms;
- (B) 11 to 23 parts by weight of acrylic elastomeric polymer containing about 30 to about 95% by weight butyl acrylate polymerized units and about 70 to about 5% by weight methyl methacrylate polymerized units; and
- (C) 15 to 30 parts by weight acrylic polymer containing about 75 to 100% weight methyl methacrylate polymerized units and about 25 to 0% by weight lower alkyl acrylate polymerized units.

2. The reinforced composition of claim 1 containing
- (A) 61 to 70 parts by weight of vinyl chloride polymer;
- (B) 13 to 20 parts by weight of acrylic elastomeric polymer containing about 60 to about 85% by weight butyl acrylate polymerized units and about 40 to about 15% by weight methyl methacrylate polymerized units; and
- (C) 18 to 27 parts by weight of acrylic polymer containing at least about 95% by weight methyl methacrylate polymer units.

3. The reinforced composition of claim 1 wherein the acrylic elastomeric polymer of (B) contains about 40 to about 90% by weight butyl acrylate polymerized units and about 60 to about 10% by weight methyl methacrylate polymerized units.

4. The reinforced composition of claim 3 wherein the acrylic elastomeric polymer of (B) contains about 60 to about 85% by weight butyl acrylate polymerized units and about 40 to about 15% by weight methyl methacrylate polymerized units.

5. The reinforced composition of claim 1 wherein the vinyl chloride polymer of (A) has an inherent viscosity from about 0.5 to about 1.2.

6. The reinforced composition of claim 5 wherein the vinyl chloride polymer of (A) has an inherent viscosity from about 0.65 to about 1.0.

7. The reinforced composition of claim 5 wherein the vinyl chloride polymer of (A) is a copolymer containing polymerized units of a lower α-olefin of 2 to 4 carbon atoms.

8. The reinforced composition of claim 5 wherein the vinyl chloride polymer of (A) is a homopolymer.

9. The reinforced composition of claim 1 wherein the acrylic polymer of (C) contains at least about 95% by weight methyl methacrylate polymerized units and an amount up to about 5% by weight of lower alkyl acrylate polymerized units.

10. The reinforced composition of claim 9 wherein the lower alkyl acrylate is ethyl acrylate.

* * * * *